(12) United States Patent
Xu et al.

(10) Patent No.: US 10,921,827 B1
(45) Date of Patent: Feb. 16, 2021

(54) PRESSURE REGULATED FLOW CONTROLLER

(71) Applicant: APPLIED MATERIALS, INC., Santa Clara, CA (US)

(72) Inventors: Ming Xu, San Jose, CA (US); Kenneth Le, Fremont, CA (US); Ashley M. Okada, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/522,614

(22) Filed: Jul. 25, 2019

(51) Int. Cl.
  *G05D 7/06* (2006.01)

(52) U.S. Cl.
  CPC ......... *G05D 7/0635* (2013.01); *G05D 7/0623* (2013.01)

(58) Field of Classification Search
  CPC ..................... G05D 7/0635; G05D 7/0623
  See application file for complete search history.

(56) References Cited

U.S. PATENT DOCUMENTS

| | | | |
|---|---|---|---|
| 5,868,159 A | 2/1999 | Loan et al. | |
| 6,782,906 B2 | 8/2004 | Chang | |
| 2015/0007897 A1 | 1/2015 | Valentine et al. | |
| 2015/0275358 A1* | 10/2015 | Smith | C23C 16/45561 137/14 |
| 2016/0041564 A1 | 2/2016 | Mudd et al. | |
| 2016/0047550 A1* | 2/2016 | McBrien | F23R 3/28 60/776 |
| 2017/0185091 A1* | 6/2017 | Johnson | G01F 25/0007 |

FOREIGN PATENT DOCUMENTS

| | | |
|---|---|---|
| KR | 20190065021 A | 6/2019 |
| WO | 2017160614 A1 | 9/2007 |

OTHER PUBLICATIONS

International Search Report and Written Opinion for International Application No. PCT/US2020/043447 dated Nov. 10, 2020, 10 pages.

* cited by examiner

*Primary Examiner* — Yuhui R Pan
(74) *Attorney, Agent, or Firm* — Lowenstein Sandler LLP (57) ABSTRACT

Disclosed herein is an apparatus for controlling a flow rate of a gas including a flow restriction element configured to restrict a flow rate of a gas; a pressure regulator coupled to an inlet of the flow restriction element, wherein the pressure regulator is configured to control a pressure of the gas between the pressure regulator and the flow restriction element; a flow meter coupled to an outlet of the flow restriction element, wherein the flow meter is configured to measure the flow rate of the gas at an outlet of the flow restriction element; and a controller operatively coupled to the pressure regulator and the flow meter, wherein the controller is to receive a measurement of the flow rate by the flow meter, determine a pressure setting associated with a target flow rate, and cause the pressure regulator to have the pressure setting.

20 Claims, 5 Drawing Sheets

PRESSURE REGULATED FLOW CONTROLLER

TECHNICAL FIELD

Embodiments of the present disclosure relate, in general, to methods and apparatuses for controlling a flow rate of a gas by regulating a pressure of the gas.

BACKGROUND

Controlling a flow rate of a gas presents a common challenge in electronic device manufacturing systems. In some electronic device manufacturing systems, process gases (i.e., gases used during the manufacture an electronic device) and/or cleaning gases (i.e., gases used to clean a manufactured electronic device and/or a chamber used in manufacturing an electronic device) may have precise delivery targets with high mass flow rates (i.e. 500 standard litres per minute (slms) or more), as well as a capability to precisely control low flow rates (i.e., 10 slms or less). Conventional electronic device manufacturing systems often use one or more mass flow controllers (MFCs) to measure and control the mass flow rate of process gases. A MFC may include a thermal-based MFC, a pressure-based MFC, or a rate-of-decay MFC, etc.

Each type of MFC may impose one or more limitations, depending on the application in which the MFC is used, thus rendering the MFC an ineffective and expensive option in measuring and controlling the flow rate of gases. For example, a rate-of-decay MFC may be used in limited applications where the gas flow rate is less than 2.0 slms. A pressure-based MFC may be used in applications if the downstream pressure of the process gas (i.e., at the outlet of the pressure-based MFC) is maintained at approximately 400 torr or below to obtain an accurate measurement and control accuracy. A thermal-based MFC may be used in applications where the gas flow rate is as high as 500 slms. However, a thermal-based MFC measures the gas flow rate by increasing a temperature of the gas using one or more heating elements and/or thermal-based sensors. Depending on the chemistry of the gas being measured by the thermal-based MFC, the increase in temperature may cause one or more components of the thermal-based MFC to corrode or cause the gas to decompose. In addition, sensors used in thermal-based MFCs may not capture flow rate measurements beyond certain thresholds, thus a wide range of flow rate measurements are not attainable using thermal-based MFCs. The limitations presented by each of the thermal-based MFC, the pressure-based MFC, and the rate-of-decay MFC drive up the cost of gas delivery systems.

SUMMARY

Some of the embodiments described cover a mass flow control apparatus including a flow restriction element configured to restrict a flow rate of a gas. The mass flow control apparatus further includes a pressure regulator coupled to an inlet of the flow restriction element, where the pressure regulator is configured to control a pressure of the gas between the pressure regulator and the flow restriction element. The mass flow control apparatus further includes a flow meter coupled to an outlet of the flow restriction element. The flow meter is configured to measure the flow rate of the gas at an outlet of the flow restriction element. The mass flow control apparatus further includes a controller that is operatively coupled to the pressure regulator and the flow meter. The controller is to receive a measurement of the flow rate by the flow meter, determine a pressure setting associated with the target flow rate, and cause the pressure to have the pressure setting.

In some embodiments, a method includes receiving, from a flow meter of a mass flow control apparatus, a measurement of a flow rate of a gas. The flow meter is coupled to an outlet of a flow restriction element of the mass flow control apparatus, and is configured to measure the flow rate of the gas at the outlet of the flow restriction element. The method further includes determining, based on a difference between the measured flow rate of the gas and a target flow rate of the gas, to change the flow rate of the gas. Responsive to determining to change the flow rate of the gas, a target pressure of the gas corresponding to the target flow rate may be determined. The method further includes transmitting, to a pressure regulator of the mass flow control apparatus coupled to an inlet of the flow restriction element, a pressure setting corresponding to the target pressure of the gas, wherein the pressure regulator is configured to control the pressure of the gas between the pressure regulator and the flow restriction element in view of the pressure setting.

In some embodiments, a non-transitory computer readable medium includes instructions that, when executed by a processing device, causes the processing device to perform operations including receiving, from a flow meter of a mass flow control apparatus, a measurement of a flow rate of a gas, where the flow meter is coupled to an outlet of a flow restriction element of the mass flow control apparatus and the flow meter is configured to measure the flow rate of the gas at the outlet of the flow restriction element. The operations further include determining, based on a difference between the measured flow rate of the gas and a target flow rate of the gas, to change the flow rate of the gas. The operations further include determining a target pressure of the gas corresponding to the target flow rate. The operations further include transmitting, to a pressure regulator of the mass flow control apparatus coupled to an inlet of the flow restriction element, a pressure setting corresponding to the target pressure of the gas, wherein the pressure regulator is configured to control the pressure of the gas between the pressure regulator and the flow restriction element in view of the pressure setting.

BRIEF DESCRIPTION OF DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Embodiments described herein relate to apparatuses and methods for controlling a flow rate of a gas of an electronic device manufacturing system by regulating a pressure of the gas. A pressure regulated flow controller may include a flow restriction element, a pressure regulator coupled to an inlet of the flow restriction element, a flow meter coupled to an outlet of the flow restriction element, and a system controller. The system controller may be operatively coupled to the pressure regulator and the flow meter. In some embodiments, the pressure regulator may be an electro-pneumatic pressure regulator. In some embodiments, the flow restriction element comprises at least one of a needle valve, a motorized valve, or a piezo valve.

A flow rate of a gas may be measured by the flow meter, which may be configured to measure the flow rate of the gas at the outlet of the flow restriction element. The measured flow rate may be transmitted to the system controller, responsive to the flow meter measuring the flow rate of the gas. Based on the measured flow rate and a target flow rate for the gas, the system controller may determine whether to change a pressure setting of the gas to cause the flow rate of the gas to correspond with the target flow rate. The system controller may determine a pressure setting for the pressure regulator, where the pressure setting is associated with the target flow rate. The system controller may determine the pressure setting based on calibration data maintained by the controller that maps pressure settings to flow rates. After determining the pressure setting associated with the target flow rate, the controller may transmit the pressure setting to the pressure regulator. The pressure regulator may control a pressure of the gas in view of the received pressure setting. By controlling the pressure of the gas in view of the received pressure setting, the pressure regulator may indirectly increase or decrease the flow rate of the gas flowing through the flow restriction element, in order to achieve the target flow rate of the gas. In some embodiments, the pressure regulated flow controller may have an operating range of between approximately 0 standard litres per minute (slms) and approximately 1200 slms. In other embodiments, the pressure regulated flow controller may have an operating range of between approximately 0 slms and approximately 500 slms.

In some embodiments, the pressure regulated flow controller may further include a bypass flow element coupled to the pressure regulator and to the flow meter in parallel to the flow restriction element. The bypass flow element may include a valve that is configured to open responsive to the pressure of the gas exiting the pressure regulator exceeding a mechanical or predetermined software controlled threshold or a flow rate of the gas exiting the pressure regulator exceeding a threshold. In some embodiments, the flow restriction element and the bypass flow elements may be components of a needle valve. In some embodiments, the pressure regulated flow controller may include multiple bypass flow elements coupled to the pressure regulator and the flow meter. In such embodiments, the multiple bypass flow elements may be coupled together in parallel such to facilitate high flow rates (i.e., flow rates greater than approximately 500 slms).

As discussed above, the system controller may maintain calibration data mapping pressure settings to flow rates. The calibration data may be used by the system controller to determine the pressure setting that will achieve the target flow rate. In some embodiments the pressure setting may include a target pressure associated with a target flow rate. In other embodiments, the pressure setting may include a difference between a target pressure and a pressure of the gas associated with a measured flow rate of the gas and an instruction to increase or decrease the pressure of the gas in accordance with the difference. The calibration data may be generated during or after initialization of the electronic device manufacturing system. In some embodiments, the calibration data is generated by the system controller transmitting an indication to the pressure regulator to modify the pressure of the gas to correspond with a test pressure of a set of test pressures. The system controller may receive, from the flow meter, a flow rate measurement corresponding with the test pressure. The system controller may update an association between the test pressure and the flow rate measurement, where the association is to be used to determine the pressure setting that will achieve a target flow rate.

In general, it may be advantageous to precisely control the flow rate of a process gas used in an electronic manufacturing process to better control the manufacturing process. By measuring and controlling the process gas using an MFC configured from a flow restriction element, a pressure regulator, a flow meter, and a system controller, as described herein, a flow rate of between approximately 0 slms to approximately 500 slms may be realized. In some embodiments where the pressure regulated flow controller includes one or more bypass flow elements, flow rates greater than 500 slms may be realized. It may be further advantageous to use the MFC configured from the flow restriction element, pressure regulator, flow meter, and controller to measure and control the process gas because the MFC described in embodiments does not adjust a temperature of the gas being measured. By not increasing the temperature of the gas using thermal-based components, the gas may not cause components of the pressure regulated flow controller to corrode or gases within the pressure regulated flow controller to decompose.

Embodiments are discussed with regards to MFCs used for restricting the flow rate of a gas used in an electronic device manufacturing system. However, it should be understood that embodiments described herein also apply to MFCs used for other purposes, such as restricting the flow rate of a gas used in other manufacturing systems.

Figure 1:
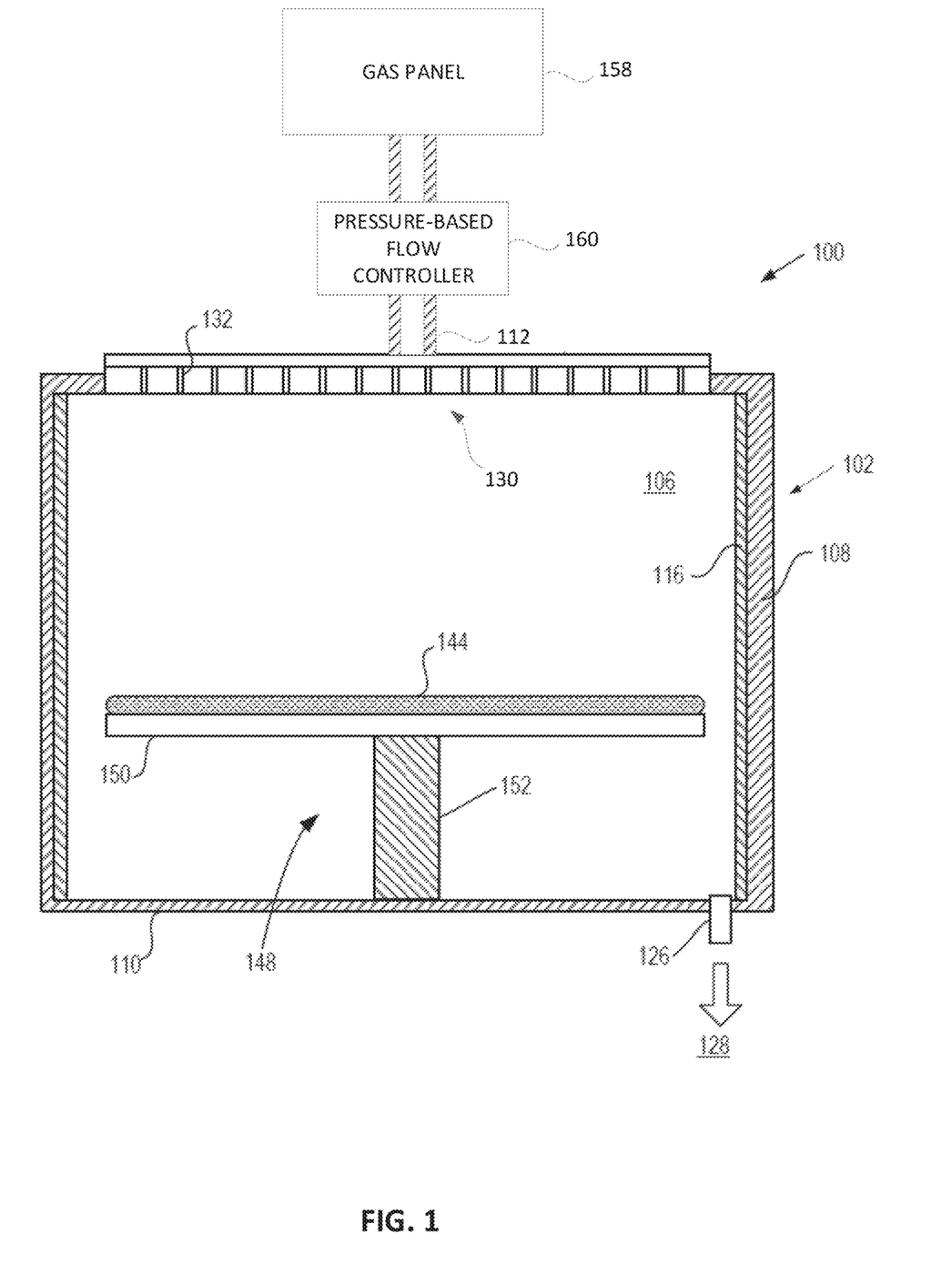
FIG. 1 depicts a sectional view of a processing chamber, in accordance with embodiments of the present disclosure.

FIG. 1 depicts a sectional view of a processing chamber 100, in accordance with embodiments of the present disclosure. The processing chamber 100 may be used for processes in which a corrosive plasma environment is provided. For example, the processing chamber 100 may be a chamber for a plasma etcher or plasma etch reactor, a plasma cleaner, and so forth. In alternative embodiments other processing chambers may be used, which may or may not be exposed to a corrosive plasma environment. Some examples of chamber components include a chemical vapor deposition (CVD) chamber, a physical vapor deposition (PVD) chamber, an atomic layer deposition (ALD) chamber, an ion assisted deposition (IAD) chamber, an etch chamber, and other types of processing chambers. In some embodiments, processing chamber 100 may be any chamber used in an electronic device manufacturing system.

In one embodiment, the processing chamber 100 includes a chamber body 102 and a showerhead 130 that encloses an interior volume 106. The showerhead 130 may include a showerhead base and a showerhead gas distribution plate. Alternatively, the showerhead 130 may be replaced by a lid and a nozzle in some embodiments, or by multiple pie shaped showerhead compartments and plasma generation units in other embodiments. The chamber body 102 may be fabricated from aluminum, stainless steel or other suitable material such as titanium (Ti). The chamber body 102 generally includes sidewalls 108 and a bottom 110.

An outer liner 116 may be disposed adjacent the sidewalls 108 to protect the chamber body 102. The outer liner 116 may be fabricated to include one or more apertures. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 100.

A gas panel 158 may be coupled to the processing chamber 100 to provide process and/or cleaning gases via supply line 112 to the interior volume 106 through a showerhead 130. A pressure regulated flow controller 160 may be coupled to gas panel 158 and processing chamber 100. Pressure regulated flow controller 160 may be used to measure and control the flow of gas from gas panel 158 to interior volume 106. Pressure regulated flow controller 160 may include at least a flow restriction element, a pressure regulator coupled to an inlet of the flow restriction element, and a flow meter coupled to an outlet of the flow restriction element. The pressure regulator and the flow meter may be operatively coupled to a system controller, where the system controller is to determine a pressure setting associated with a target flow rate and cause the pressure regulator to have the pressure setting. Further details with respect to Pressure regulated flow controller are provided with respect to FIG. 2. In some embodiments, one or more gas panels 158 may be coupled to processing chamber 100 to provide gases to the interior volume 106 through showerhead 130. In such embodiments, one or more pressure regulated flow controllers 160 may be coupled to each gas panel 158 and processing chamber 100.

The showerhead 130 may be supported on the sidewall 108 of the chamber body 102. The showerhead 130 (or lid) may be opened to allow access to the interior volume 106 of the processing chamber 100, and may provide a seal for the processing chamber 100 while closed. A gas panel 158 may be coupled to the processing chamber 100 to provide process and/or cleaning gases to the interior volume 106 through the showerhead 130 or lid and nozzle (e.g., through apertures of the showerhead or lid and nozzle). Showerhead 130 may be used for processing chambers used for dielectric etch (etching of dielectric materials). The showerhead 130 may include a gas distribution plate (GDP) and may have multiple gas delivery holes 132 (also referred to as channels) throughout the GDP. The showerhead 130 may be formed by metal or alloy plate with the protection by a multi-layer protective coating as described herein. The metal or alloy plate may be composed of aluminum, an aluminum alloy, or another metal or metal alloy. The showerhead 130 may be formed with the GDP bonded to an aluminum base or an anodized aluminum base. The GDP may be made from Si or SiC, or may be a ceramic such as $Y_2O_3$, $Al_2O_3$, $Y_3Al_5O_{12}$ (YAG), and so forth.

For processing chambers used for conductor etch (etching of conductive materials), a lid may be used rather than a showerhead. The lid may include a center nozzle that fits into a center hole of the lid. The lid may be a ceramic such as $Al_2O_3$, $Y_2O_3$, YAG, or a ceramic compound including $Y_4Al_2O_9$ and a solid-solution of $Y_2O_3$—$ZrO_2$. The nozzle may also be a ceramic, such as $Y_2O_3$, YAG, or the ceramic compound including $Y_4Al_2O_9$ and a solid-solution of $Y_2O_3$—$ZrO_2$.

Examples of processing gases that may be used to process substrates in the processing chamber 100 include halogen-containing gases, such as $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. Flow rates of any of these gases may be measured using the pressure regulated flow controller 160. A remote plasma may be formed from any of these and/or other processing gases and then delivered through supply line 112, through pressure regulated flow controller 160, to chamber 100. Accordingly, the remote plasma may be composed of $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. Examples of carrier gases include $N_2$, He, Ar, and other gases inert to process gases (e.g., non-reactive gases).

A substrate support assembly 148 is disposed in the interior volume 106 of the processing chamber 100 below the showerhead 130. The substrate support assembly 148 holds a substrate 144 during processing. A ring (e.g., a single ring) may cover a portion of the electrostatic chuck 150, and may protect the covered portion from exposure to plasma during processing. The ring may be silicon or quartz in one embodiment.

An inner liner may be coated on the periphery of the substrate support assembly 148. The inner liner may be a halogen-containing gas resist material such as those discussed with reference to the outer liner 116. In one embodiment, the inner liner may be fabricated from the same materials of the outer liner 116.

In one embodiment, the substrate support assembly 148 includes a pedestal 152 that supports an electrostatic chuck 150. The electrostatic chuck 150 further includes a thermally conductive base and an electrostatic puck bonded to the thermally conductive base by a bond, which may be a silicone bond in one embodiment. The thermally conductive base and/or electrostatic puck of the electrostatic chuck 150 may include one or more optional embedded heating elements, embedded thermal isolators and/or conduits to control a lateral temperature profile of the substrate support assembly 148. The electrostatic puck may further include multiple gas passages such as grooves, mesas and other surface features that may be formed in an upper surface of the electrostatic puck. The gas passages may be fluidly coupled to a source of a heat transfer (or backside) gas such as He via holes drilled in the electrostatic puck. In operation, the backside gas may be provided at controlled pressure into the gas passages to enhance the heat transfer between the electrostatic puck and a supported substrate 144. The electrostatic chuck 150 may include at least one clamping electrode controlled by a chucking power source.

Figure 2:
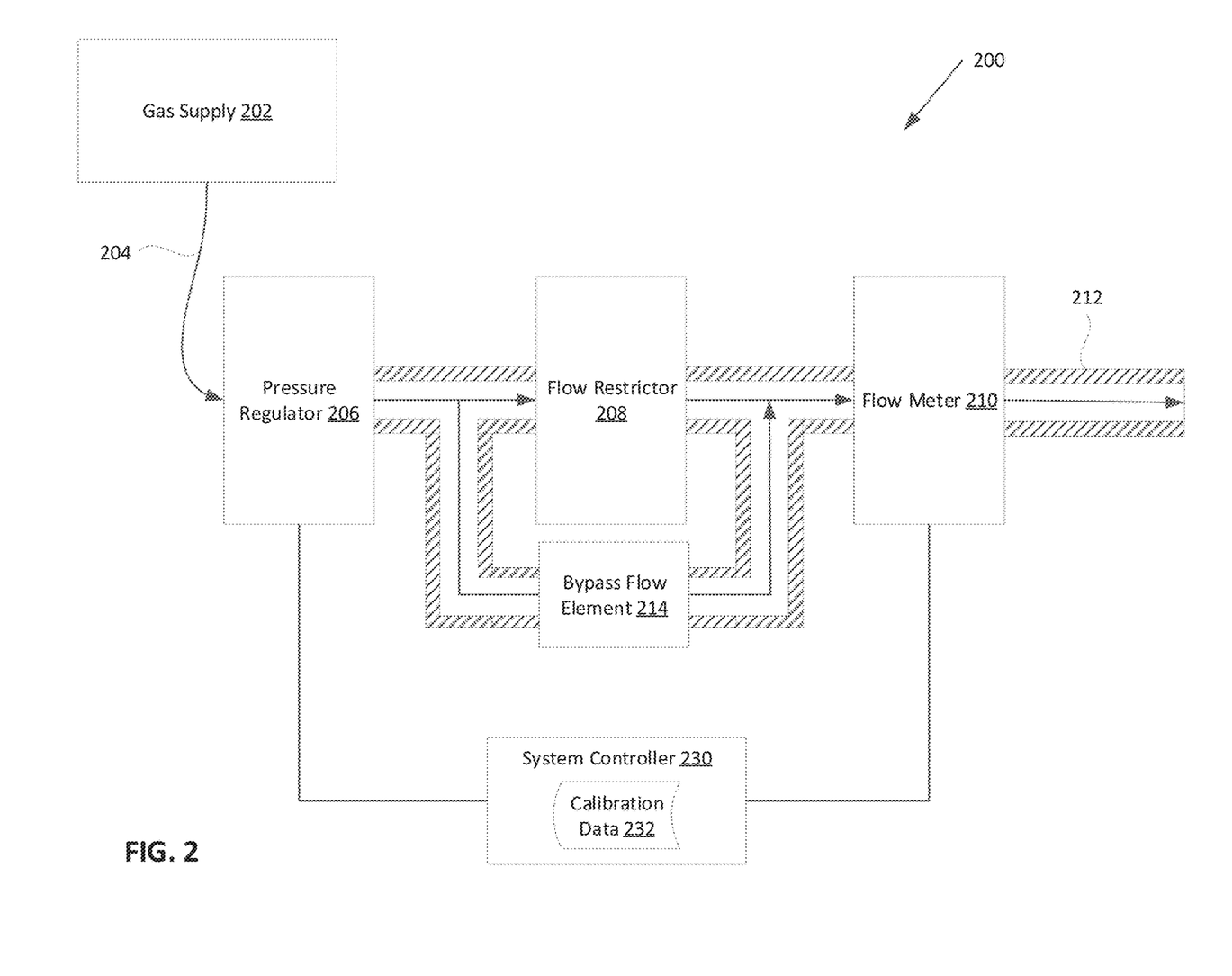
FIG. 2 depicts a sectional view of a Pressure regulated flow controller, in accordance with embodiments of the present disclosure.

FIG. 2 depicts a sectional view of a pressure regulated flow controller 200, in accordance with embodiments of the present disclosure. Pressure regulated flow controller 200 may be configured to measure and control a mass flow rate of a process gas and/or a cleaning gas used in an electronic device manufacturing system, and thus may be considered a type of MFC. In some embodiments, pressure regulated flow controller 200 may correspond with pressure regulated flow controller 160 of FIG. 1. Pressure regulated flow controller 200 may be coupled to a gas supply 202 via a supply line 204. Gas supply 202 and supply line 204 may correspond with gas panel 158 and supply line 112 of FIG. 1, respectively.

As discussed previously, pressure regulated flow controller 200 may include at least a pressure regulator 206, a flow restriction element (flow restrictor) 208, and a flow meter 210. Pressure regulator 206 may be coupled to an inlet for flow restriction element 208, and flow meter 210 may be coupled to an outlet for flow restriction element 208. Pressure regulated flow controller 200 may further include a system controller 230 which is operatively coupled to pressure regulator 206 and flow meter 210. An outlet of flow meter 210 may be coupled to an inlet of a processing chamber of an electronics manufacturing system (also not shown) or other system via supply line 212.

Pressure regulator 206 may be configured to control a pressure of the gas between pressure regulator 206 and flow restriction element 208. In some embodiments, pressure regulator 206 may be an electro-pneumatic pressure regulator (e-regulator). Pressure regulator 206 may have an operating pressure control range of between approximately 0 kPa to approximately 750 kPa. In some embodiments, pressure regulator 206 may have an operating pressure control range of between approximately 0 kPa to approximately 500 kPa. In other embodiments, pressure regulator 206 may have an operating pressure control range of between approximately 100 kPa to approximately 400 kPa. Pressure regulator 206 may have a minimum working pressure of approximately 100 kPa and a maximum working pressure of approximately 700 kPa in some embodiments. In some embodiments, pressure regulator 206 may have a gas flow rate capacity of between approximately 0 slm to approximately 1500 slms. In other embodiments, pressure regulator 206 may have a gas flow rate capacity of between approximately 10 slms to approximately 500 slms.

In some embodiments, pressure regulator 206 may further include a controller component. The controller component may include a central processing unit (CPU), microcontroller, or other suitable computer processing device, a memory, and support circuits. The controller component may be configured to execute programming instructions related to the operation of pressure regulator 206. For example, pressure regulator 206 may execute an instruction relating to increasing or decreasing a pressure of a gas at an outlet of the pressure regulator 206. The controller component may further include an input/output (I/O) component that is configured to transmit and/or receive instructions from the system controller. As discussed previously, pressure regulator 206 may be operatively coupled to the system controller 230. The system controller 230 may transmit one or more pressure settings to pressure regulator 206 to cause pressure regulator 206 to change a pressure of the gas in view of the transmitted pressure setting(s).

Flow restriction element 208 may be configured to restrict a flow rate of a gas. Flow restriction element 208 may have an operating flow rate range of between approximately 0 slms to approximately 1200 slms. In some embodiments, flow restriction element 208 may have an operating flow rate range of between approximately 10 slms to approximately 500 slms. In some embodiments, flow restriction element 208 may be a needle valve, a motorized valve, a piezo valve, etc.

In some embodiments, pressure regulated flow controller 200 may further include a bypass flow element 214. Bypass flow element 214 may include a bypass flow path and a bypass valve. The bypass valve may be configured to open responsive to either a pressure of the gas exceeding a threshold pressure or a flow rate of the gas exceeding a threshold flow rate. Bypass flow element 214 may facilitate a higher gas flow rate than may be possible without bypass flow element 214. In some embodiments, bypass flow element 214 may be coupled to flow restriction element 208 in parallel. In some embodiments, bypass valve may be a mechanical throttling valve.

In some embodiments, flow restriction element 208 and bypass flow element 214 may be components of a single flow restriction component 218. For example, in some embodiments, flow restriction element 208 and bypass flow element 214 may be components of a speed control valve. In such embodiments, flow restriction element 208 may have an operating flow rate range of between approximately 0 slms to approximately 1200 slms. In other embodiments, flow restriction element may have an operating flow rate range of between approximately 10 slms to approximately 500 slms. Flow restriction element 208 may include one or more mechanical components which may be moved (e.g., manually or automatically) within flow restriction element 208 in order to increase or decrease the flow of the gas through flow restriction element 208. In some embodiments, the one or more mechanical components within flow restriction element 208 may not move as the gas flows through restriction element 208. In such embodiments, the flow rate of the gas may be controlled based on a pressure of the gas prior to the gas flowing through flow restriction element 208. As discussed previously, the pressure of the gas may be controlled by pressure regulator 206, which is coupled to an inlet of flow restriction element 208.

Flow meter 210 may be configured to measure the flow rate of the gas at the outlet of flow restriction element 208. Flow meter 210 may be at least one of a thermal-based flow meter, a pressure-based flow meter, etc. In some embodiments, flow meter 210 may have an operating flow range of between approximately 0 slm to approximately 2000 slm. In other embodiments, flow meter 210 may have an operating flow range of approximately 10 slms to approximately 500 slms.

In some embodiments, flow meter 210 may further include a controller component. The controller component may include a central processing unit (CPU), microcontroller, or other suitable computer processing device, a memory, and support circuits. The controller component may be configured to execute programming instructions related to the operation of flow meter 210. For example, flow meter 210 may execute an instruction relating to measuring a flow rate of a gas flowing through flow meter 210. The controller component may further include an input/output (I/O) component that is configured to transmit and/or receive instructions from the system controller 230.

As discussed previously, flow meter 210 may be operatively coupled with the system controller 230. The system controller 230 may receive measurements of the flow rate of the gas at the outlet of flow restriction element 208 from flow meter 210. In some embodiments, flow meter 210 may be configured to consistently (e.g., continuously) measure the flow rate of the gas at the outlet of flow restriction element 208 and transmit measurements of the flow rate to the system controller 230 as the measurements are generated. In other embodiments, flow meter 210 may be configured to periodically measure the flow rate of the gas and transmit the measurements to the system controller 230 as the measurements are generated. In such embodiments, the period in which flow meter 210 is to measure the flow rate of the gas may be established by a user of the pressure regulated flow controller 200 or based on one or more operating conditions associated with one or more components of the pressure regulated flow controller.

The system controller 230 may be any suitable computing device coupled to and/or configured to control one or more components of the electronic device manufacturing system. In some embodiments, the system controller 230 may be configured to control one or more components of pressure regulated flow controller 200, but may not be configured to control other components of a manufacturing system. The system controller 230 may include a central processing unit, microcontroller, or other suitable computer processing device, a memory, and support circuits. The system controller 230 may be configured to execute programming instructions related to the operation of pressure regulated flow controller 200. In some embodiments, the system controller 230 may be a programmable logic controller (PLC), a system on a chip SoC, a server computer, or other type of computing device.

The system controller 230 may be configured to receive a measurement of the flow rate by flow meter 210. Responsive to receiving the measurement of the flow rate, the system controller 230 may determine, based on a difference between the measured flow rate and a target flow rate of the gas, to change the flow rate of the gas. The system controller 230 may determine a target pressure corresponding to the target flow rate and transmit a pressure setting corresponding to the target pressure of the gas to the pressure regulator. The pressure setting may be determined based on calibration data 232 mapping pressure settings to flow rates. Different calibration data 232 may be determined during calibration for different gases. In some embodiments, the pressure setting may include the target pressure associated with the target flow rate. In other embodiments, the pressure setting may include a difference between the target pressure and a pressure of the gas associated with the measured flow rate of the gas, and an instruction to the pressure regulator to increase or decrease the pressure of the gas in accordance with the difference. Responsive to determining a pressure setting based on the calibration data, the system controller 230 may transmit the pressure setting to pressure regulator 206. Responsive to receiving the pressure setting from system controller 230, pressure regulator 206 may change the pressure of the gas in view of the received pressure setting. Further details regarding determining the pressure setting and generating calibration data 232 is provided with respect to FIGS. 3 and 4.

Figure 3:
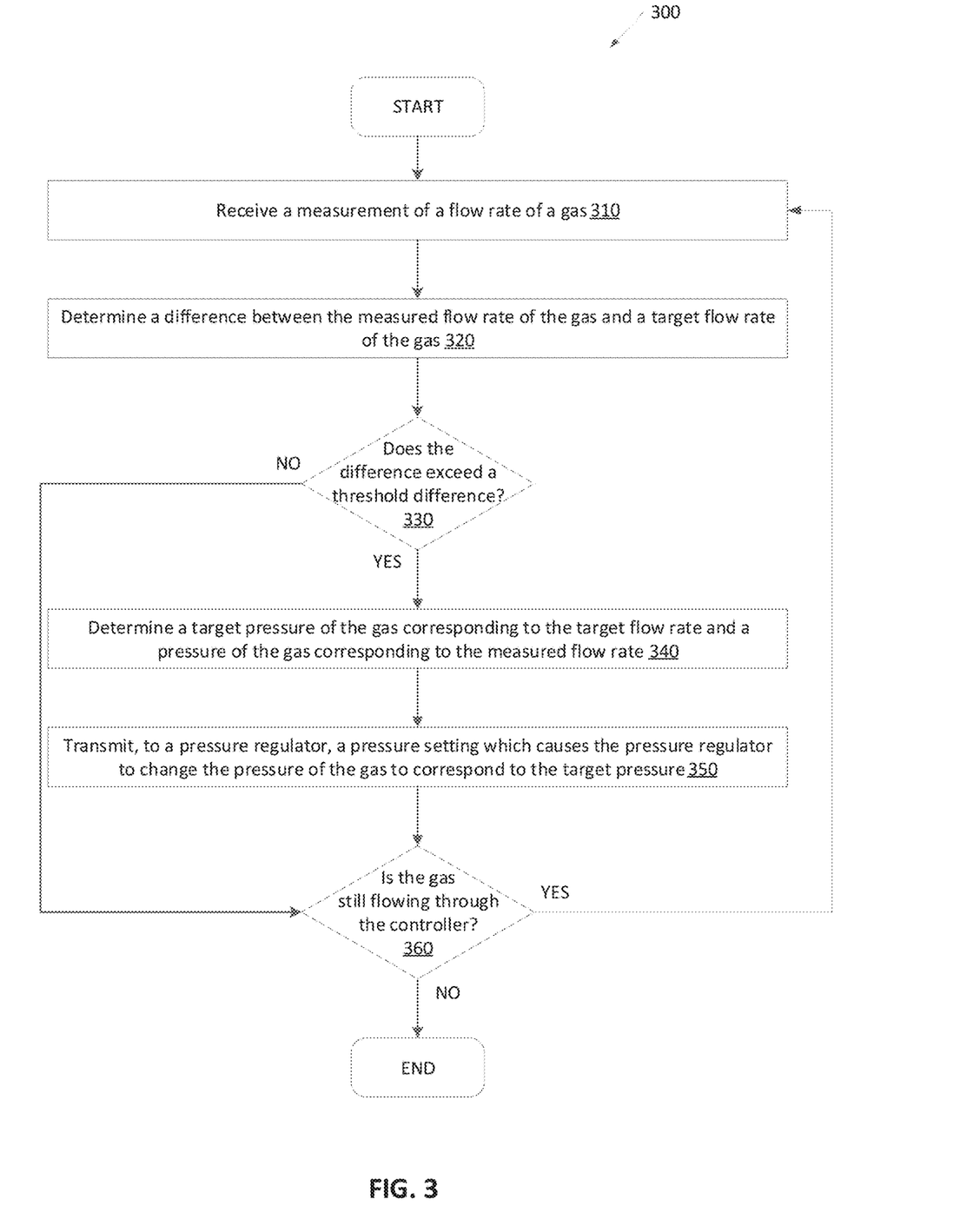
FIG. 3 illustrates a method for controlling the flow rate of a gas based on a pressure of the gas, in accordance with embodiments of the present disclosure.

FIG. 3 illustrates a method 300 for controlling the flow rate of a gas based on a pressure of the gas, in accordance with embodiments of the present disclosure. The operations of method 300 may be performed, for example, by a system controller (e.g., computing device) of a pressure regulated flow controller. At block 310, a measurement of the flow rate of the gas may be received. In some embodiments, the measurement of the flow rate of the gas may be received by a system controller of a pressure regulated flow controller, such as pressure regulated flow controller 160 of FIG. 1 or pressure regulated flow controller 200 of FIG. 2. In some embodiments, the measurement of the flow rate of the gas may be received from a flow meter of a pressure regulated flow controller, such as flow controller 210 of FIG. 2.

At block 320, a difference between the measured flow rate and a target flow rate is determined. The system controller may determine, based on the difference between the measured flow rate of the gas and a target flow rate of the gas, to change the flow rate of the gas. In some embodiments, a target flow rate of the gas may also be received by the system controller. The target flow rate may be established by a setting of a process recipe, which may be provided to the system controller. The target flow rate may additionally or alternatively be established based on an operating condition of one or more components of the pressure regulated flow controller.

At block 330, the system controller may determine whether the difference exceeds a difference threshold. In some embodiments, the threshold difference may be a fixed or configurable setting. In other embodiments, the threshold difference may be established based on an operating condition or an operating threshold of one or more components of the pressure regulated flow controller. In some embodiments, the threshold difference is 0 slms. Accordingly, any difference between the current flow rate and the target flow rate may trigger a change in the pressure. If the difference exceeds the difference threshold, then the method may continue to block 340. If the difference does not exceed the difference threshold, then the method may proceed to block 360.

At block 340, a target pressure of the gas corresponding to the target flow rate and a pressure of the gas corresponding to the measured flow rate may be determined. In some embodiments, the target pressure of the gas is determined by identifying the target pressure from calibration data maintained by the system controller. The calibration data may map pressures of gas controlled by the pressure restrictor to flow rates measured by the flow meter. Further details regarding the generation of calibration data are provided with respect to FIG. 4 herein. The controller may determine the target flow rate of the gas and the measured flow rate of the gas. Based on the target flow rate and the measured flow rate, the controller may identify, from the calibration data, a target pressure associated with the target flow rate and a pressure of the gas associated with the measured flow rate. The system controller may also determine a current pressure setting of the pressure regulator.

In some embodiments, the system controller may account for one or more system errors (i.e., an unexpected temperature increase of the gas, etc.) to determine the target pressure associated with the target flow rate. In such embodiments, the system controller may use at least one of a proportional control gain (i.e., a term or value that shows a proportional relationship between the target flow rate and the measured flow rate), an integral control gain (i.e., a term or value that accounts for past differences between the target flow rate and the measured flow rate), and a derivative control gain (i.e., a term or value that represents a rate at which an error between the target flow rate and the measured flow rate has been changing) to account for the one or more system errors. The proportional control gain, the integral control gain, and the derivative control gain may be used, along with the difference between the target flow rate received from the system controller and the measured flow rate, as determined at block 320, to determine an adjusted target flow rate for the gas. In some embodiments, the adjusted target flow rate may be slightly higher or slightly lower than the received target flow rate (i.e., ±10% difference). The target pressure for the system may be identified from the calibration data based on the adjusted target flow rate rather than the received target flow rate. By identifying the target pressure based on the adjusted target flow rate, the target pressure may be more accurately identified, as the adjusted target flow rate accounts for one or more system error, which may not be accounted for if the target pressure were identified based on the received target flow rate. Additionally, because the adjusted target flow rate accounts for previous differences between target flow rates and measured flow rates, the system controller may more quickly identify the target pressure for the gas.

At block 350, a pressure setting is transmitted to the pressure regulator which causes the pressure regulator to change the pressure of the gas to correspond to the target pressure. In some embodiments, the pressure setting may include the target pressure of the gas. In such embodiments, a controller component of the pressure regulator may execute a series of one or more instructions which cause the pressure of the gas to increase or decrease in view of the target pressure of the pressure setting. In other embodiments, the pressure setting may include a difference between the target pressure and the pressure of the gas. In such embodiments, the controller component of the pressure regulator may execute a series of one or more instructions which cause the pressure of the gas to increase or decrease in accordance with the pressure difference of the pressure setting.

At block 360, it may be determined whether gas is still flowing through the pressure regulated flow controller. The determination of whether gas is still flowing may be based on whether a measured flow rate of the gas by the flow meter exceeds a threshold flow rate. For example, the threshold flow rate may be 1.0 slm. If the system controller receives a measurement from the flow meter indicating that the flow rate of the gas is less than 1.0 slm, it may be determined that gas is no longer flowing through the pressure regulated flow controller. If it is determined that the gas is not still flowing through the pressure regulated flow controller, method 300 may terminate.

If it is determined that gas is still flowing through the pressure regulated flow controller, method 300 may return to block 310, where method 300 may continually repeat while gas is flowed. Accordingly, the controller may receive a second measurement of the flow rate of the gas. The second measurement may be received after the pressure regulator has changed the pressure of the gas in view of the pressure setting. The controller may determine, based on a difference between the measured flow rate of the gas and the target flow rate of the gas, whether to change the flow rate of the gas in accordance with previously described embodiments. Larger changes in pressure may be performed initially, followed by smaller changes in pressure in some embodiments to quickly adjust the flow rate to a target flow rate.

Figure 4:
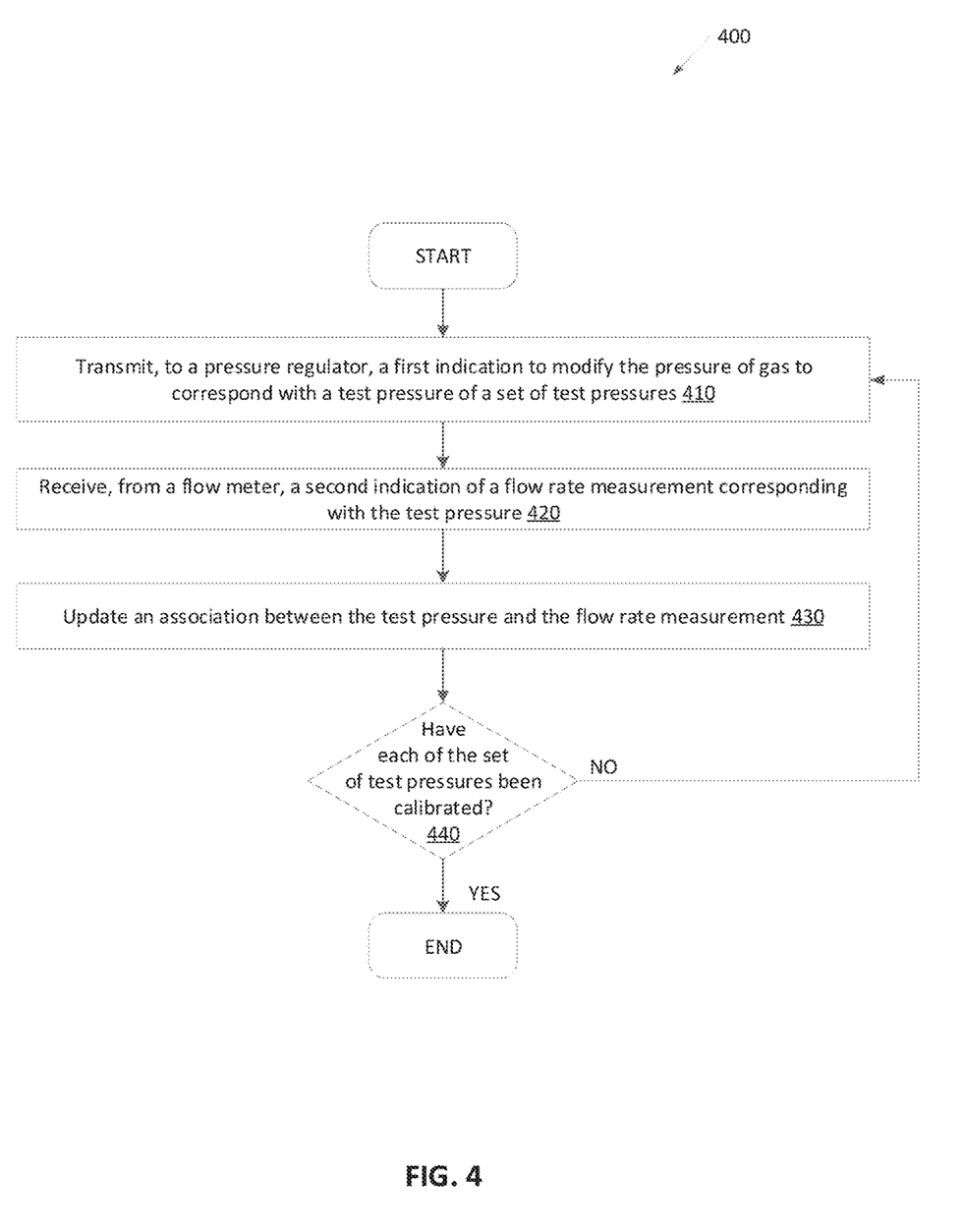
FIG. 4 illustrates a method for generating calibration data for use in controlling the flow rate of a gas, in accordance with embodiments of the present disclosure.

FIG. 4 illustrates a method 400 for generating calibration data for use in controlling the flow rate of a gas, in accordance with embodiments of the present disclosure. The operations of method 400 may be performed, for example, by a system controller (e.g., computing device) of a pressure regulated flow controller. The relationship between the pressure of the gas and the flow rate of the gas may be a non-linear relationship (i.e., a constant change of the pressure of the gas may not necessarily correspond with a constant change of the flow rate of the gas, and vice versa). As such, calibration data may be generated for use by the system controller in determining a pressure setting of a pressure regulator corresponding to a target flow rate of the gas. In some embodiments, the calibration data may be generated at initialization of the pressure regulated flow controller. In other embodiments, the calibration data may be generated in response to a user request to re-calibrate the pressure regulated flow controller after the pressure regulated flow controller has been initialized. In some embodiments, the calibration data applies to a particular gas. Accordingly, different calibrations may be performed for different gases if multiple gases may be monitored and controlled by the pressure regulated flow controller.

At block 410, a first indication is transmitted to a pressure regulator to modify the pressure of a gas to correspond with a test pressure of a set of test pressures. The pressure regulator may be a pressure regulator of a pressure regulated flow controller, in accordance with previously described embodiments. In some embodiments the set of test pressures are provided by a user of the pressure regulated flow controller, or by a calibration recipe. In other embodiments, the set of test pressures are established based on one or more operating conditions associated with one or more components of the pressure regulated flow controller. For example, the set of test pressures may be established based on a minimum operating pressure of the pressure regulator and a maximum operating pressure of the pressure regulator.

At block 420, a second indication is received, from a flow meter, including a flow rate measurement corresponding with the test pressure. The flow meter may be a flow meter of the pressure regulated flow controller, in accordance with previously described embodiments.

At block 430, an association between the test pressure and the flow rate measurement may be updated. In some embodiments, the pressure regulated flow controller may be calibrated during initialization of the pressure regulated flow controller. In such embodiments, the association between the test pressure and the flow rate measurement may be generated. In other embodiments, the calibration data may be generated responsive to a request to re-calibrate the pressure regulated flow controller after initialization of the electronic device manufacturing system. In such embodiments, it may be determined whether the association between the test pressure and the flow rate measurement has changed since the pressure regulated flow controller was last calibrated. Responsive to determining that the association has changed, the association between the test pressure and the flow rate measurement may be updated to reflect the most recent calibration of the pressure regulated flow controller. At block 440, it is determined whether each of the set of test pressures have been calibrated. Responsive to determining that each of the set of test pressures have not been calibrated, method 400 may return to block 410, where a different test pressure of the set of test pressures may be selected and calibrated in accordance with previously disclosed embodiments. Responsive to determining that each of the set of test pressures have been calibrated, method 400 may terminate.

Figure 5:
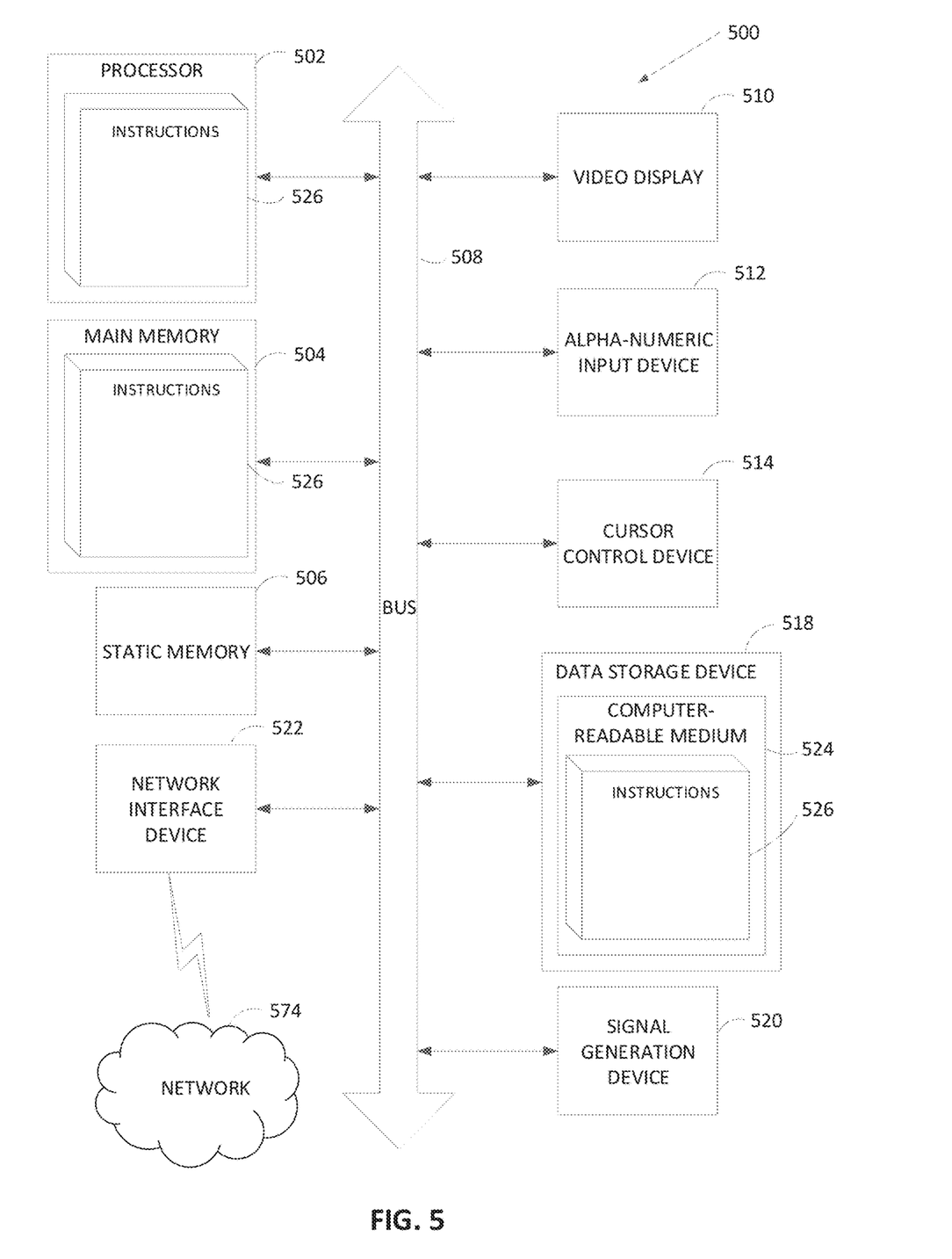
FIG. 5 is a block diagram illustrating a computer system, according to certain embodiments.

FIG. 5 is a block diagram illustrating a computer system 500, according to certain embodiments. In some embodiments, computer system 500 may be system controller 230 (e.g., see FIG. 2). In other embodiments, computer system 500 may be a controller component of pressure regulator 206 or a controller component of flow meter 210.

In some embodiments, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522 (e.g., that communicates via network 574). Computer system 500 also may include a video display unit 510 (e.g., an LCD), an alphanumeric input device 512 (e.g., a keyboard), a cursor control device 514 (e.g., a mouse), and a signal generation device 520.

In some implementations, data storage device 516 may include a non-transitory computer-readable storage medium 524 on which may store instructions 526 encoding any one or more of the methods or functions described herein, including instructions for implementing methods described herein (e.g., performing method 300 or 400 of FIGS. 3 and 4).

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "non-transitory computer-readable storage medium" shall include a single medium or multiple media (e.g., a centralized or distributed database, and/or associated caches and servers) that store the one or more sets of executable instructions. The term "non-transitory computer-readable storage medium" shall also include any tangible medium that is capable of storing or encoding a set of instructions for execution by a computer that cause the computer to perform any one or more of the methods described herein. The term "non-transitory computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "scanning," "moving," "causing," "performing," "removing," "placing," "directing," "determining," "disposing," "actuating," "locating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A mass flow control apparatus comprising:
   a flow restriction element configured to restrict a flow rate of a gas;

a pressure regulator coupled to an inlet of the flow restriction element, wherein the pressure regulator is configured to control a pressure of the gas between the pressure regulator and the flow restriction element;

a flow meter coupled to an outlet of the flow restriction element, wherein the flow meter is configured to measure the flow rate of the gas at an outlet of the flow restriction element;

one or more bypass flow elements coupled to the pressure regulator and to the flow meter, wherein each of the one or more bypass flow elements are configured to control the flow rate of the gas in parallel to the flow restriction element; and a controller operatively coupled to the pressure regulator and the flow meter, wherein the controller is to receive a measurement of the flow rate by the flow meter, determine a pressure setting associated with a target flow rate, and cause the pressure regulator to have the pressure setting.

2. The mass flow control apparatus of claim 1, wherein each bypass flow element comprises a valve configured to open responsive to at least one of the pressure exceeding a threshold pressure or the flow rate exceeding a threshold flow rate.

3. The mass flow control apparatus of claim 1, wherein the flow restriction element and the one or more bypass flow elements are components of a speed control valve.

4. The mass flow control apparatus of claim 1, wherein the pressure regulator comprises an electro-pneumatic pressure regulator.

5. The mass flow control apparatus of claim 1, wherein the mass flow control apparatus has an operating range of between approximately 10 standard litre per minute (slm) and approximately 500 slm.

6. The mass flow control apparatus of claim 1, wherein the pressure regulator has an operating pressure control range of between approximately 0 kPa to approximately 750 kPa.

7. The mass flow control apparatus of claim 1, wherein the flow restriction element comprises at least one of a needle valve, a motorized valve, or a piezo valve.

8. The mass flow control apparatus of claim 1, wherein the controller comprises calibration data mapping pressure settings to flow rates, and wherein the calibration data is used to determine the pressure setting that will achieve the target flow rate.

9. The mass flow control apparatus of claim 8, wherein the calibration data is generated at least during initialization of the mass flow control apparatus or after initialization of the mass flow control apparatus.

10. A method comprising:
receiving, from a flow meter of a mass flow control apparatus, a measurement of a flow rate of a gas, wherein the flow meter is coupled to an outlet of a flow restriction element and an outlet of one or more bypass flow elements of the mass flow control apparatus and the flow meter is configured to measure the flow rate of the gas at the outlet of the flow restriction element and the outlet of the one or more bypass flow elements;

determining, based on a difference between the measured flow rate of the gas and a target flow rate of the gas, to change the flow rate of the gas;

determining a target pressure of the gas corresponding to the target flow rate; and transmitting, to a pressure regulator of the mass flow control apparatus, the pressure regulator coupled to an inlet of the flow restriction element and an inlet of the one or more bypass flow elements, a pressure setting corresponding to the target pressure of the gas, wherein the pressure regulator is configured to control the pressure of the gas between at least one of the pressure regulator and the flow restriction element or the pressure regulator and the one or more bypass flow elements in view of the pressure setting.

11. The method of claim 10, wherein determining the target pressure of the gas corresponding to the target flow rate comprises:
receiving an indication of the target flow rate of the gas; and
identifying, from calibration data mapping pressure settings to flow rates, the target pressure of the gas corresponding with the target flow rate.

12. The method of claim 10, further comprising:
transmitting, to the pressure regulator, an instruction to modify the pressure of the gas to correspond with a test pressure of a plurality of test pressures;
receiving, from the flow meter, an indication of a flow rate measurement corresponding with the test pressure; and
updating an association between the test pressure and the flow rate measurement in calibration data.

13. The method of claim 10, wherein each bypass flow element comprises a valve configured to open responsive to at least one of the pressure exceeding a threshold or the flow rate exceeding a threshold.

14. The method of claim 10, wherein the flow restriction element and the one or more bypass flow elements are components of a speed control valve.

15. The method of claim 10, wherein the pressure regulator comprises an electro-pneumatic pressure regulator.

16. The method of claim 10, wherein the mass flow control apparatus has an operating range of between approximately 10 standard litre per minute (slm) and approximately 500 slm.

17. The method of claim 10, wherein the flow restriction element comprises at least one of a needle valve, a motorized valve, or a piezo valve.

18. A non-transitory computer readable medium comprising instructions, when executed by a processing device, cause the processing device to perform operations comprising:
receiving, from a flow meter of a mass flow control apparatus, a measurement of a flow rate of a gas, wherein the flow meter is coupled to an outlet of a flow restriction element and an outlet of one or more bypass flow elements of the mass flow control apparatus and the flow meter is configured to measure the flow rate of the gas at the outlet of the flow restriction element and the outlet of the one or more bypass low elements;

determining, based on a difference between the measured flow rate of the gas and a target flow rate of the gas, to change the flow rate of the gas;

determining a target pressure of the gas corresponding to the target flow rate; and transmitting, to a pressure regulator of the mass flow control apparatus, the pressure regulator coupled to an inlet of the flow restriction element and an inlet of the one or more bypass flow elements, a pressure setting corresponding to the target pressure of the gas, wherein the pressure regulator is configured to control the pressure of the gas between at least one of the pressure regulator and the flow restriction element or the pressure regulator and the one or more bypass flow elements in view of the pressure setting.

19. The non-transitory computer readable medium of claim 18, wherein to determine the target pressure of the gas corresponding to the target flow rate, the processing device is to perform operations comprising:
  receiving an indication of the target flow rate of the gas; and
  identifying, from calibration data mapping pressure settings to flow rates, the target pressure of the gas corresponding with the target flow rate.

20. The non-transitory computer readable medium of claim 18, wherein the processing device is to perform operations further comprising:
  transmitting, to the pressure regulator, a first indication to modify the pressure of the gas to correspond with a test pressure of a plurality of test pressures;
  receiving, from the flow meter, a second indication of a flow rate measurement corresponding with the test pressure; and
  updating an association between the test pressure and the flow rate measurement in calibration data.

\* \* \* \* \*